(12) United States Patent
Flatland et al.

(10) Patent No.: US 11,834,074 B1
(45) Date of Patent: Dec. 5, 2023

(54) TECHNIQUES FOR REDUCING WEAR ON A VEHICLE

(71) Applicant: Zoox, Inc., Foster City, CA (US)

(72) Inventors: Ryan O'Leary Flatland, Foster City, CA (US); Bryan Payton Schmidt, Parker, CO (US)

(73) Assignee: Zoox, Inc., Foster City, CA (US)

( * ) Notice: Subject to any disclaimer, the term of this patent is extended or adjusted under 35 U.S.C. 154(b) by 212 days.

(21) Appl. No.: 17/384,438

(22) Filed: Jul. 23, 2021

(51) Int. Cl.
*B60W 60/00* (2020.01)

(52) U.S. Cl.
CPC .......................... *B60W 60/00186* (2020.02); *B60W 60/00276* (2020.02); *B60W 2510/0208* (2013.01); *B60W 2510/0657* (2013.01)

(58) Field of Classification Search
CPC ..... B60W 60/00186; B60W 60/00276; B60W 2510/0208; B60W 2510/0657
See application file for complete search history.

(56) References Cited

U.S. PATENT DOCUMENTS

| | | | | |
|---|---|---|---|---|
| 2011/0065547 A1* | 3/2011 | DeFrank | ................. | B60L 50/10 903/902 |
| 2021/0380135 A1* | 12/2021 | Kanitz | ............... | G01C 21/3484 |

* cited by examiner

*Primary Examiner* — James J Lee
*Assistant Examiner* — Alexander George Matta
(74) *Attorney, Agent, or Firm* — Lee & Hayes, P.C.

(57) ABSTRACT

Techniques for reducing the wear on vehicles. For instance, a vehicle may include a bidirectional vehicle that operates in a first mode at which a first end of the vehicle operates as a front of the vehicle and a second mode at which a second end of the vehicle operates as the front of the vehicle. As such, the vehicle may store data representing a first distance that the vehicle has traveled while operating in the first mode and a second distance that the vehicle has traveled while operating in the second mode. The vehicle may then detect the occurrence of an event. Based on the occurrence of the event, the vehicle may select a mode for operating the vehicle using the first distance and the second distance. For example, the vehicle may select the mode that is associated with the shortest distance.

18 Claims, 7 Drawing Sheets

TECHNIQUES FOR REDUCING WEAR ON A VEHICLE

BACKGROUND

Vehicles may experience normal wear while operating as intended. For example, a motor, wheels, bearings, brake units, and/or other components of a vehicle may experience wear just from the vehicle navigating around various environments over long periods of time. This wear experienced by the vehicle may cause various components of the vehicle to fail or require maintenance, such that the components need to be replaced or serviced for the vehicle. In some circumstances, different components of the vehicle may experience different degrees of wear based on how the vehicle is navigating. For example, the wheels and bearings may experience greater wear as the vehicle navigates longer distances while the motor may experience greater wear as the vehicle is undergoing greater torques.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
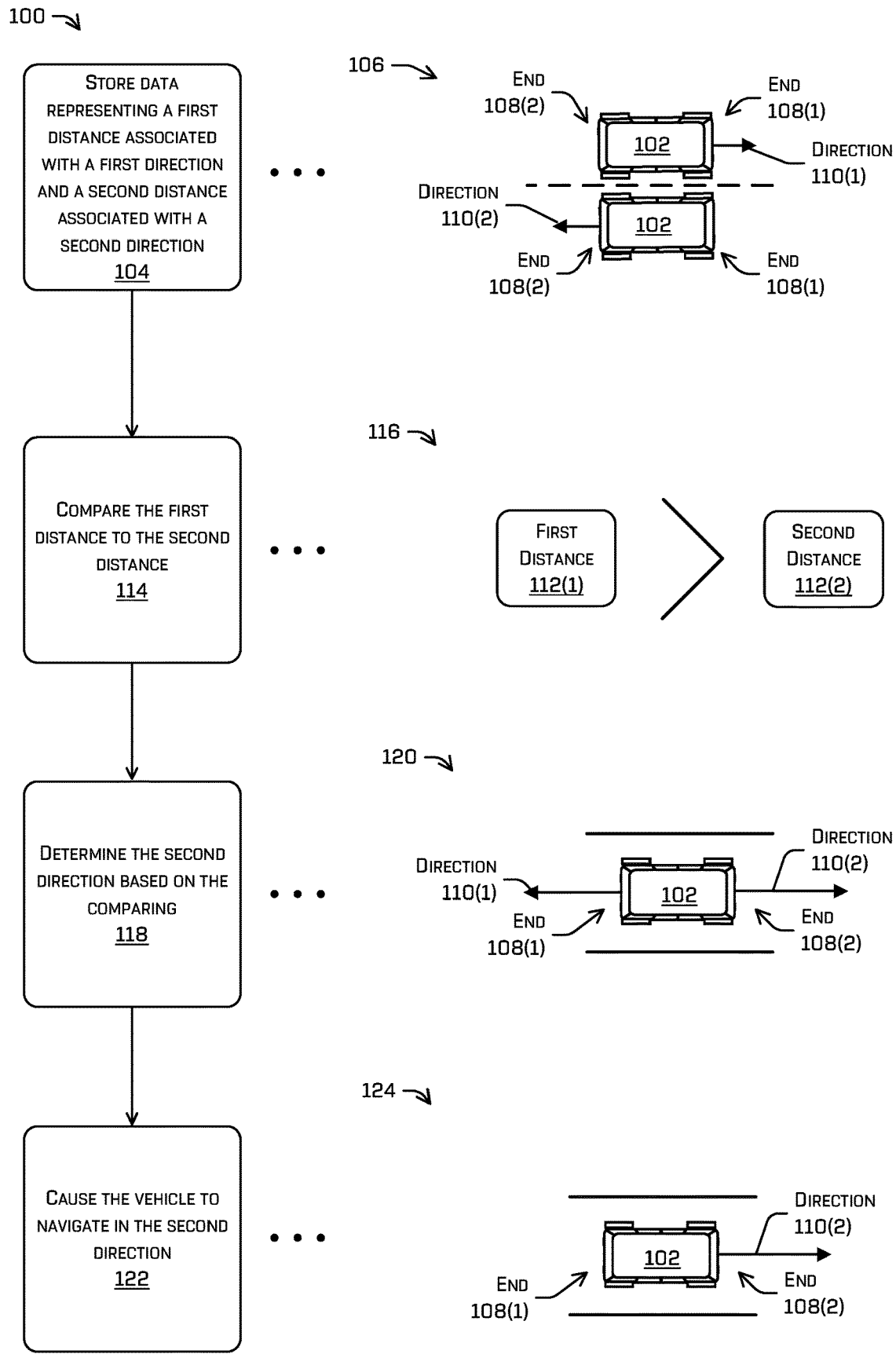
FIG. 1 is a pictorial flow diagram of an example process for reducing wear on a vehicle.

As discussed above, vehicles may experience normal wear while operating as intended. For example, a motor, wheels, bearings, brake units, and/or other components of a vehicle may experience wear just from the vehicle navigating around various environments over long periods of time. This wear experienced by the vehicle may cause various components of the vehicle to fail, such that the components need to be replaced on the vehicle. In some circumstances, different components of the vehicle may experience different degrees of wear based on how the vehicle is navigating. For example, the wheels and bearings may experience greater wear as the vehicle navigates longer distances while the wheels may experience greater wear as the vehicle is undergoing greater torques. Because of this, changing how the vehicle is operates may increase the total life of the components of the vehicle.

As such, the present application relates to techniques for reducing wear on a vehicle. For instance, the vehicle may be include a bidirectional vehicle that is configured to navigate in a first direction of travel at which a first end of the vehicle operates as the front of the vehicle and a second direction of travel at which a second, opposite end of the vehicle operates as the front of the vehicle. The vehicle may then use odometer(s) to determine distance(s) (referred to, in some examples, as "first distance(s)") that the vehicle has traveled in the first direction of travel and distance(s) (referred to, in some examples, as "second distance(s)") that the vehicle has traveled in the second direction of travel. Using these distances, the vehicle may select which direction of travel to operate in in order to reduce the wear on components of the vehicle. For example, the vehicle may be configured to travel substantially equal distances in the first direction of travel and the second direction of travel in order to evenly distribute the wear to the components of the vehicle. As such, the vehicle may select the direction of travel that is associated with the shortest distance. For example, if the vehicle has traveled a greater distance while navigating in the first direction of travel than while navigating in the second direction of travel, the vehicle may select the second direction of travel for navigation.

As discussed, in some examples the vehicle may be a bidirectional vehicle that is configured to operate in at least two modes. In a first mode, a first end of the vehicle may operate as the front of the vehicle such that lights included on the first end of the vehicle operate as the headlights and lights included on a second, opposite end of the vehicle operate as the taillights. As such, in the first mode, the vehicle may be configured to navigate in the first direction of travel such that the first end of the vehicle is the leading end of the vehicle. In a second mode, the second end of the vehicle may operate as the front of the vehicle such that the lights included on the second end of the vehicle operate as the headlights and the lights included on the first end of the vehicle operate as the taillights. As such, in the second mode, the vehicle may be configured to navigate in the second direction of travel such that the second end of the vehicle is the leading end of the vehicle.

Additionally, in some examples, the vehicle may include more than one drive system, such as a first drive system associated with the first end of the vehicle (e.g., a first axle of the vehicle) and a second drive system associated with the second end of the vehicle (e.g., a second axle of the vehicle). As such, the vehicle may select which drive system or systems to use to operate the vehicle based on the selected mode as well as other factors. For example, the vehicle may determine to operate the vehicle using front-wheel drive such that the vehicle uses the first drive system when operating in the first mode and uses the second drive system while operating in the second mode. For another example, the vehicle may determine to operate the vehicle using rear-wheel drive such that the vehicle uses the second drive system when operating in the first mode and uses the first drive system while operating in the second mode. Still, for another example, the vehicle may determine to operate in four-wheel drive such that the vehicle uses both drive systems while operating in either mode. In such an example, the vehicle may apply torque similarly to each drive system and/or the vehicle may apply torque differently to each of the drive systems. These are just a few example techniques of how the vehicle may select the drive systems, in other examples, the vehicle may select the drive systems using additional and/or alternative techniques.

In some examples, the vehicle may include a single drive system that operates in two different modes (referred to, in some examples, as "drive system modes") based on the operating mode of the vehicle. For example, the vehicle may determine to operate the drive system in a first drive system mode while operating in the first mode and determine to operate the drive system in a second drive system mode while operating in the second mode. In such an example, the drive system operating in the first drive system mode may cause the vehicle to travel in the first direction and the drive system operating in the second drive system mode may cause the vehicle to travel in the second direction. In some examples, a mode may correspond to a corresponding drive mode (e.g., a primarily front wheel or rear wheel drive mode) wherein one or more wheels are favored to be driven. This can be referred to as biasing certain drive wheels. In some examples, a front wheel, rear wheel, or balanced bias can be applied when a vehicle is configured to operate in one of two bidirectional modes as disclosed herein. In some examples, a direction of travel can be balanced with wear applied to one or more wheels, axles, or other powertrain components to balance an amount of wear with a direction of wear. As such, the drive system may wear differently based on operating mode of the vehicle.

Additionally, in some examples, the vehicle may include more than one steering system, such as a first steering system associated with the first end of the vehicle (e.g., a first axle of the vehicle) and a second steering system associated with the second end of the vehicle (e.g., a second axle of the vehicle). As such, the vehicle may select which steering system or steering systems to use to operate the vehicle based on the selected mode as well as other factors. For example, the vehicle may determine to operate a front steering system such that the vehicle uses the first steering system when operating in the first mode and uses the second steering system while operating in the second mode. For another example, the vehicle may determine to operate the vehicle using a rear steering system such that the vehicle uses the second steering system when operating in the first mode and uses the first steering system while operating in the second mode. Still, for another example, the vehicle may determine to operate using both steering systems while operating in either mode. These are just a few example techniques of how the vehicle may select the steering systems, in other examples, the vehicle may select the steering systems using additional and/or alternative techniques.

The vehicle may include odometer(s), wheel encoder(s), and/or other component(s) that are configured to determine the first distance(s) that the vehicle travels while operating in the first mode (e.g., while navigating in the first direction of travel) and the second distance(s) that the vehicle travels while operating in the second mode (e.g., while navigating in the second direction of travel). The vehicle may then store first data representing the first distance(s) and second data representing the second distance(s). Additionally, the vehicle may use the distance(s) in order to select a mode for operating the vehicle. In some examples, the vehicle selects the mode that is associated with the shortest distance. For example, if the first data indicates that the vehicle has traveled 100 miles while operating in the first mode and the second data indicates that the vehicle has traveled 200 miles while operating in the second mode, then the vehicle may select the first mode for operating the vehicle based on 200 miles being greater than 100 miles.

In some examples, the vehicle performs this mode selection based on the occurrences of various events. An event may include, but is not limited to, a period of time elapsing (e.g., 1 hour, 24 hours, 1 week, etc.), an instruction being received for navigating to a location, the vehicle being capable of changing the mode of operation (e.g., the vehicle being at a location for which the vehicle is capable of changing the direction of travel), initiation or completion of charging or fueling of the vehicle, completion of a startup or restart process, and/or the like. For example, at the start of each day, the vehicle may perform the processes described herein in order to select a mode to begin operating the vehicle. For another example, if the vehicle parks in a parking spot for which the vehicle is able to navigate in both the first direction of travel and the second direction of travel, the vehicle may perform the processes described herein in order to again select a mode to operate the vehicle. For another example, at the start of each new trip the vehicle may perform the processes described herein in order to select a mode to begin operating the vehicle.

While the examples above describe the vehicle determining the direction of travel based on distances the vehicle has previously traveled in the different modes, in some examples, the vehicle may determine the direction of travel to use based on a mileage, age, wear, and/or condition of various components of the vehicle. For example, the vehicle may use the odometer(s) to determine distance(s) (referred to, in some examples, as "third distance(s)") that the vehicle travels while using a first component of the vehicle (e.g., a first drive system of the vehicle) and distance(s) (referred to, in some examples, as "fourth distance(s)") that the vehicle travels while using a second component of the vehicle (e.g., a second drive system of the vehicle). In some examples, the vehicle may then store third data representing the third distance(s) and/or fourth data representing the fourth distance(s). The vehicle may then additionally, and/or alternatively, use these distances when selecting the mode for operating the vehicle. For example, it may be desirable to maintain equal wear between the first component and the second component, in which case the vehicle may select mode that uses the component that is associated with the shortest distance. For another example, such as when the components include drive systems, the vehicle may select the drive system that is associated with the shortest distance. In this example, the vehicle may or may not still select the mode for operating the vehicle based on the first distance(s) and the second distance(s). The preceding examples describe using distances as a proxy for the degree of wear of components of the vehicle. However, in other examples, instead of (or in addition to) using distance as a proxy for wear, the vehicle may use age, measured wear, and/or measured condition of one or more components as a basis for determining how to control the vehicle (e.g., the mode of the vehicle, the drive system to use, the steering system to use, etc.).

In some examples, the vehicle may use additional operational factors when selecting the mode for operating the vehicle. For example, the vehicle may determine one or more operational factors associated with navigating the vehicle in the first mode and one or more second operational factors associated with navigating the vehicle in the second mode. As described herein, an operational factor may include, but is not limited to, a torque loading that is applied, a number of clutch engagements, an environment in which the vehicle is navigating (e.g., in a city, in a rural area, on a highway, etc.), weather conditions while operating, and/or the like. In some examples, the vehicle may then store fifth data representing the one or more first operational factors and sixth data representing the one or more second operational factors. The vehicle may then additionally, and/or alternatively, use the operational factors when selecting the mode for operating the vehicle.

For example, the vehicle may select the mode (and/or drive system or other component) that is associated with the least amount of torque loading. The vehicle may select such a mode since the wear that occurs to certain component(s) of the vehicle, such as bearings, may increase when a greater amount of torque is applied. As such, these component(s) that the vehicle uses while operating in the mode with the least amount of torque loading may include less wear than similar component(s) that the vehicle uses while operating in the mode that includes the greater amount of torque loading. For another example, the vehicle may select the mode (and/or the drive system or other component) that is associated with the least number of clutch engagements. Again, the vehicle may select such a mode since the wear that occurs to certain component(s), such as a clutch, may increase when there is a greater number of clutch engagements. As such, these component(s) that the vehicle uses while operating in the mode with the least number of clutch engagements may include less wear than similar component(s) that the vehicle uses while operating in the mode that includes the greater number of clutch engagements.

Still, for another example, the vehicle may weigh the first distance(s) and/or the second distance(s), described above, based on the environment(s) in which the vehicle was navigating while operating in the different modes. For instance, the vehicle may weigh distances that were navigated in a first type of environment, such as cities, greater than the vehicle weighs distances that were navigated in a second type of environment, such as highways. As such, even if a first data indicates that the vehicle has traveled 100 miles while operating in the first mode and the second data indicates that the vehicle has traveled 200 miles while operating in the second mode, the vehicle may still select the second mode if the vehicle was navigating in cities while operating in the first mode and the navigating on highways while operating in the second mode. This may be because the vehicle may experience more wear while operating in cities than while operating on highways.

In some examples, the vehicle may additionally or alternatively use current conditions associated with the vehicle when selecting the mode for operating. The current conditions may include, but are not limited to, a number of passengers within the vehicle, location(s) of the passenger(s) within the vehicle, the environment in which the vehicle is currently navigating, the weather, the expected distance that the vehicle will travel, and/or the like. For example, the vehicle may be configured to navigate in a direction of travel that is opposite to where the passengers are located within the vehicle. As such, if the passengers are located within the vehicle at locations that are close to the first end of the vehicle, then the vehicle may use that information to select the second mode for operating the vehicle. For another example, the vehicle may be configured to navigate in a direction of travel that is based on a direction for which the passengers are facing. As such, if the passengers are facing towards the first end of the vehicle, then the vehicle may use that information to select the first mode for operating the vehicle.

While the examples above describe selecting the mode based on the distances traveled in each mode, in other examples, the vehicle may use additional and/or alternative measures. For example, the vehicle may store data representing a first time that the vehicle has traveled while operating in the first mode and a second time that the vehicle has traveled while operating in the second mode. The vehicle may then select a mode for navigating using the times. For instance, the vehicle may select the mode that is associated with the shortest time. Additionally, while the examples above describe that the modes are associated with directions of travel, in other examples, the modes may be associated with additional and/or alternative operations of the vehicle. For example, the first mode may be associated with a first drive system, a first steering system, and/or the like, and the second mode may be associated with a second drive system, a second steering system, and/or the like.

The examples above describe selecting the mode for operating the vehicle, such as at the occurrence of an event. In some examples, such as when the vehicle is an autonomous vehicle, the vehicle may be configured to automatically switch between the modes of operation during normal operation. For example, when picking a customer up at a pickup location, the vehicle may initially operate in the first mode until arriving at the pickup location, which may include a driveway. Since the vehicle has pulled into the driveway, the vehicle may automatically switch to operating in the second mode so that the vehicle does not have to "backout" of the driveway and switch directions (this may increase the overall safety of the ride for the passenger). As such, even though the vehicle started operating in the first mode, the vehicle may operate in both the first mode and the second mode during a given period of time. However, by causing the vehicle to switch modes at given times, such as the occurrences of the events, the distances traveled by the vehicle in the first mode and the second mode may stay substantially equal.

Additionally, while the examples above describe that the vehicle may primarily use a first drive system when operating in the first mode and primarily use a second drive system when operating in the second mode, in some examples, the vehicle may primarily use additional first component(s) when operating in the first mode and primarily use additional second component(s) when operating in the second mode. For example, the vehicle may primarily use a first steering unit while operating in the first mode and primarily use a second steering unit while operating in the second mode. For another example, the vehicle may primarily use first radiator(s) while operating in the first mode and primarily use second radiator(s) while operating in the second mode.

By performing the processes described herein, the vehicle may extend the total life of the vehicle and/or the total life(s) of component(s) of the vehicle. This is because the vehicle may evenly distribute the wear between the components of the vehicle. For example, if the vehicle includes the first drive system that the vehicle primarily uses while operating in the first mode and the second drive system that the vehicle primarily uses while operating in the second mode, the vehicle may ensure that the first distance(s) navigated using the first drive system are substantially equal (within a threshold amount) to the second distance(s) navigated using the second drive system. As such, the vehicle may ensure that the wear that occurs to the first drive system is also substantially equal to the wear that occurs to the second drive system. This may increase the total life the two drive systems for the vehicle.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a sensor system or a robotic platform), and are not limited to autonomous vehicles. In another example, the techniques may be utilized in an aviation or nautical context, or in any system evaluating distances between reference points in an environment (e.g., in a system using route-relative planning). Additionally, the techniques described herein may be used with real data (e.g., captured using sensor(s)), simulated data (e.g., generated by a simulator), or any combination of the two.

FIG. 1 is a pictorial flow diagram of an example process 100 for reducing wear on a vehicle 102. At operation 104, the process 100 may include storing data representing a first distance associated with a first direction and a second distance associated with a second distance. For instance, an example 106 illustrates that the vehicle 102 may include a bidirectional vehicle that is configured to operate in at least two modes. In a first mode, a first end 108(1) of the vehicle 102 may operate as the front of the vehicle 102 such that lights included on the first end 108(1) of the vehicle 102 operate as the headlights and lights included on a second, opposite end 108(2) of the vehicle 102 operate as the taillights. In a second mode, the second end 108(2) of the vehicle 102 may operate as the front of the vehicle 102 such that the lights included on the second end 108(2) of the vehicle 102 operate as the headlights and the lights included on the first end 108(1) of the vehicle 102 operate as the taillights.

As such, while operating in the first mode, the vehicle 102 may travel in a first direction of travel 110(1) and, while operating in the second mode, the vehicle 102 may travel in a second direction of travel 110(2). While navigating in each mode, the vehicle 102 may include odometer(s) that are configured to determine the first distance 112(1) that the vehicle 102 travels in the first direction of travel 110(1) and the second distance 112(2) that the vehicle 102 travels in the second direction of travel 110(2). Additionally, the vehicle 102 may be configured to generate the data representing the first distance 112(1) and the second distance 112(2). In some examples, the vehicle 102 then stores that data locally on the vehicle 102. Additionally, or alternatively, in some examples, the vehicle 102 may send the data to one or more computing devices.

At operation 114, the process 100 may include comparing the first distance to the second distance. For instance, an example 116 illustrates that the vehicle 102 may compare the first distance 112(1) to the second distance 112(2). In some examples, the vehicle 102 compares the first distance 112(1) to the second distance 112(2) based on the occurrence of an event. For example, the vehicle 102 may compare the first distance 112(1) to the second distance 112(2) based on determining that a time interval has elapsed (e.g., at the start of the day). In the example of FIG. 1, based on the comparison, the vehicle 102 may determine that the first distance 112(1) is greater than the second distance 112(2).

At operation 118, the process 100 may include determining the second direction based on the comparing. For instance, an example 120 illustrates that the vehicle 102 is at a location (e.g., a parking spot) at which the vehicle 102 is able to navigate in both the first direction of travel 110(1) and the second direction of travel 110(2). As such, based on determining that the first distance 112(1) is greater than the second distance 112(2), the vehicle 102 may determine to operate in the second mode at which the vehicle 102 navigates in the second direction of travel 110(2). In some examples, the vehicle 102 may perform one or more additional and/or alternative processes for selecting the second direction of travel 110(2). For example, the vehicle 102 may use distance(s) associated with various component(s) of the vehicle 102, operational factor(s) associated with the modes, current condition(s) associated with the vehicle 102, and/or the like.

At operation 122, the process 100 may include causing the vehicle to navigate in the second direction. For instance, an example 124 illustrates that the vehicle 102 is navigating in the second direction of travel 110(2). While navigating, the vehicle 102 may continue to update the second data representing the second distance based on the new distance that the vehicle 102 travels while operating in the second mode. Additionally, if the vehicle 102 switches to operating in the first mode, such that the vehicle 102 begins to navigate in the first direction of travel 110(1), then the vehicle 102 may update the first data representing the first distance based on the new distance that the vehicle 102 travels while operating in the first mode. At the occurrence of an event, the vehicle 102 may once again perform operations 114, 118, and 122.

Figure 2:
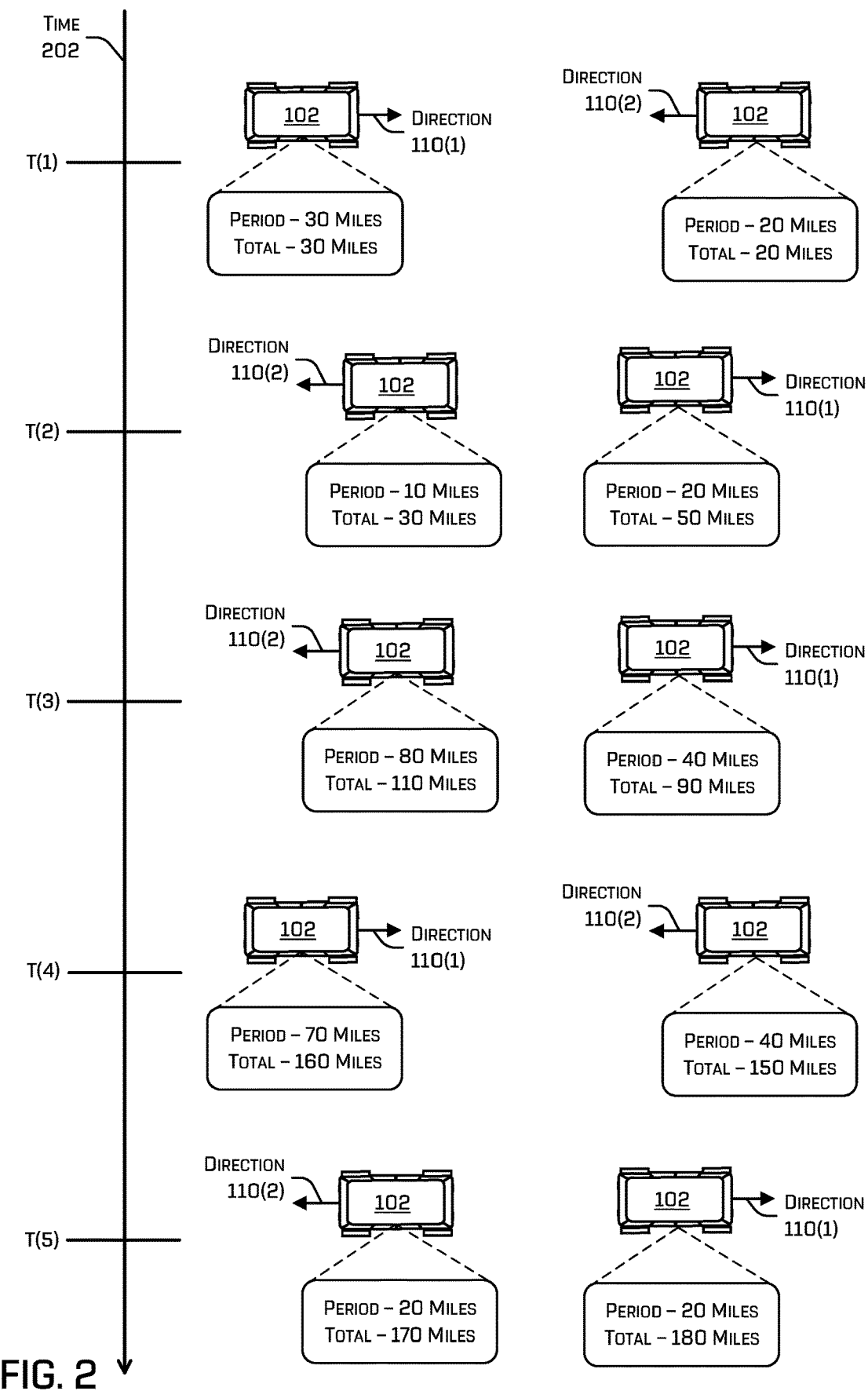
FIG. 2 is an example of selecting a mode for operating a vehicle based on distances that the vehicle has traveled in different modes.

FIG. 2 is an example of selecting a mode for operating the vehicle 102 based on distances that the vehicle 102 has traveled in different modes. For instance, and as shown, over a period of time 202, the vehicle 102 may travel around one or more environments, such as to provide rides to passengers. During a first time period T(1), the vehicle 102 may initially begin to operate in the first mode where the vehicle 102 travels in the first direction of travel 110(1). As shown, the vehicle 102 travels for 30 miles in the first mode during the first time period T(1) which brings the total that the vehicle 102 has traveled in the first mode to 30 miles. Additionally, during the first time period T(1), the vehicle 102 may also operate in the second mode where the vehicle 102 travels in the second direction of travel 110(2). As shown, the vehicle 102 travels for 20 miles in the second mode during the first time period T(1) which brings the total that the vehicle 102 has traveled in the second mode to 20 miles.

Next, at the beginning of a second time period T(2), the vehicle 102 may compare the distance that the vehicle 102 has traveled in the first mode to the distance that the vehicle 102 has traveled in the second mode. In the example of FIG. 2, based on the comparing, the vehicle 102 may determine that the distance the vehicle 102 has traveled in the first mode is greater than the distance that the vehicle 102 has traveled in the second mode (e.g., 30 miles is greater than 20 miles). As such, during the second time period T(2), the vehicle 102 may initially begin to operate in the second mode where the vehicle 102 travels in the second direction of travel 110(2). As shown, the vehicle 102 travels for 10 miles in the second mode during the second time period T(2) which brings the total that the vehicle 102 has traveled in the second mode to 30 miles. Additionally, during the second time period T(2), the vehicle 102 may also operate in the first mode where the vehicle 102 travels in the first direction of travel 110(1). As shown, the vehicle 102 travels for 20 miles in the first mode during the second time period T(2) which brings the total that the vehicle 102 has traveled in the first mode to 50 miles.

Next, at the beginning of a third time period T(3), the vehicle 102 may again compare the distance that the vehicle 102 has traveled in the first mode to the distance that the vehicle 102 has traveled in the second mode. In the example of FIG. 2, based on the comparing, the vehicle 102 may determine that the distance the vehicle 102 has traveled in the first mode is greater than the distance that the vehicle 102 has traveled in the second mode (e.g., 50 miles is greater than 30 miles). As such, during the third time period T(3), the vehicle 102 may initially begin to operate in the second mode where the vehicle 102 travels in the second direction of travel 110(2). As shown, the vehicle 102 travels for 80 miles in the second mode during the third time period T(3) which brings the total that the vehicle 102 has traveled in the second mode to 110 miles. Additionally, during the third time period T(3), the vehicle 102 may also operate in the first mode where the vehicle 102 travels in the first direction of travel 110(1). As shown, the vehicle 102 travels for 40 miles in the first mode during the third time period T(3) which brings the total that the vehicle 102 has traveled in the first mode to 90 miles.

Next, at the beginning of a fourth time period T(4), the vehicle 102 may again compare the distance that the vehicle 102 has traveled in the first mode to the distance that the vehicle 102 has traveled in the second mode. In the example of FIG. 2, based on the comparing, the vehicle 102 may determine that the distance the vehicle 102 has traveled in the second mode is now greater than the distance that the vehicle 102 has traveled in the first mode (e.g., 110 miles is greater than 90 miles). As such, during the fourth time period T(4), the vehicle 102 may initially begin to operate in the first mode where the vehicle 102 travels in the first direction of travel 110(1). As shown, the vehicle 102 travels for 70 miles in the first mode during the fourth time period T(4) which brings the total that the vehicle 102 has traveled in the first mode to 160 miles. Additionally, during the fourth time period T(4), the vehicle 102 may also operate in the second mode where the vehicle 102 travels in the second direction of travel 110(2). As shown, the vehicle 102 travels for 40 miles in the second mode during the fourth time period T(4) which brings the total that the vehicle 102 has traveled in the second mode to 150 miles.

Finally, at the beginning of a fifth time period T(5), the vehicle 102 may again compare the distance that the vehicle 102 has traveled in the first mode to the distance that the vehicle 102 has traveled in the second mode. In the example of FIG. 2, based on the comparing, the vehicle 102 may determine that the distance the vehicle 102 has traveled in the first mode is now greater than the distance that the vehicle 102 has traveled in the second mode (e.g., 160 miles is greater than 150 miles). As such, during the fifth time period T(5), the vehicle 102 may initially begin to operate in the second mode where the vehicle 102 travels in the second direction of travel 110(2). As shown, the vehicle 102 travels for 20 miles in the second mode during the fifth time period T(5) which brings the total that the vehicle 102 has traveled in the second mode to 170 miles. Additionally, during the fifth time period T(5), the vehicle 102 may also operate in the first mode where the vehicle 102 travels in the first direction of travel 110(1). As shown, the vehicle 102 travels for 20 miles in the first mode during the fifth time period T(5) which brings the total that the vehicle 102 has traveled in the first mode to 180 miles.

As shown by the example of FIG. 2, by selecting the mode at which the vehicle 102 operates using the distances traveled by the vehicle 102 in each direction, the vehicle 102 is able keep the total distance that the vehicle 102 travels in the first mode to be substantially equal to the total distance that the vehicle 102 travels in the second mode. In some examples, the start of each time period may correspond to an occurrence of a respective event. For example, the start of each time period may correspond to the start of a new day. For another example, the start of each time period may correspond to a time at which the vehicle 102 is in a position to switch the mode for which the vehicle 102 is operating.

Figure 3:
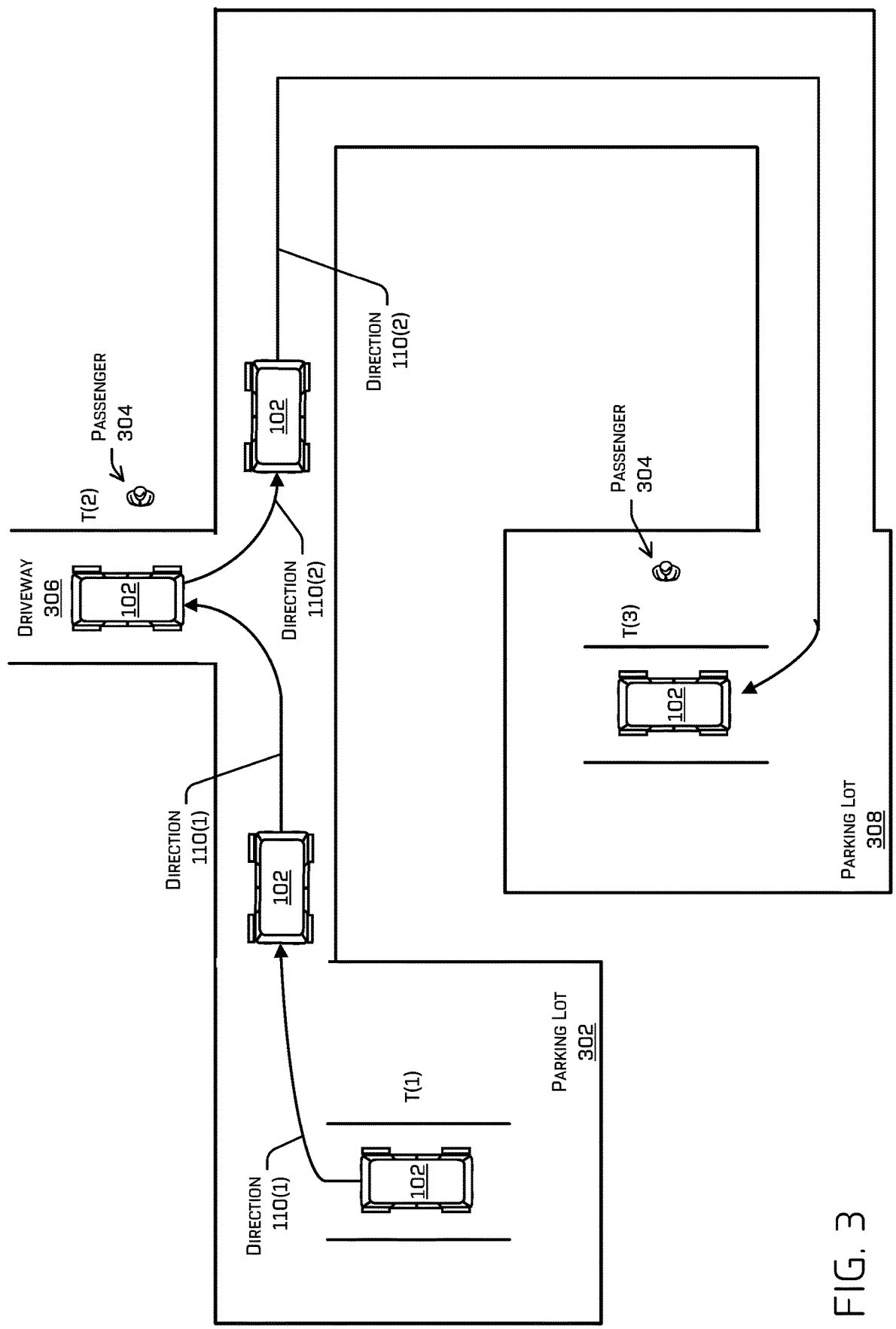
FIG. 3 is an example of a vehicle switching between modes during operation of the vehicle.

FIG. 3 is an example of the vehicle 102 switching between modes during operation of the vehicle 102. As shown, at a first time T(1), the vehicle 102 may be parked at a parking lot 302. While parked, the vehicle 102 may detect an occurrence of an event. For example, the vehicle 102 may determine that a period of time has elapsed (e.g., it is the start of the day). For another example, the vehicle 102 may receive an instruction to pickup a passenger 304 at a first location, which is represented by a driveway 306, and drop the passenger 304 off at a second location, which is represented by another parking lot 308. In either example, based on detecting the occurrence of the event, the vehicle 102 may determine a mode for operating the vehicle 102.

For example, the vehicle 102 may compare a first distance that the vehicle 102 has traveled while operating in the first mode to a second distance that the vehicle 102 has traveled while operating in the second mode. Based on the comparison, the vehicle 102 may select the mode that is associated with the shortest distance, which includes the first mode in the example of FIG. 3. In some examples, and as described herein, the vehicle 102 may use one or more additional operational factors when selecting the first mode. The vehicle 102 may then begin to navigate in the first direction of travel 110(1) that is associated with the first mode.

Next, at a second time T(2), the vehicle 102 may arrive at the first location for picking up the passenger 304. As shown, the vehicle 102 picks the passenger 304 up by driving into the driveway 306 and parking. As shown by the example of FIG. 3, after picking up the passenger 304, the vehicle 102 may then switch to operating in the second mode. This may be because it is easier and/or safer for the vehicle 102 to switch to the second mode in order to drive straight out of the driveway 306 than it would be for the vehicle 102 to stay in the first mode and have to reverse out of the driveway 306. As such, the vehicle 102 may begin to navigate in the second direction of travel 110(2) that is associated with the second mode.

Next, at a third time T(3), the vehicle 102 may arrive at the second location for dropping off the passenger 304. As shown, the vehicle 102 drops the passenger 304 off by parking in the parking lot 308. In some examples, after dropping the passenger 304 off, the vehicle 102 may again be able to select the mode for operating the vehicle 102 since the vehicle 102 is able to begin navigating in the first direction of travel 110(1) or the second direction of travel 110(2). In other words, the vehicle 102 may again detect that an event has occurred at which the vehicle 102 is able to select the mode for operating the vehicle 102. Similar to the discussion above, and in some examples, the vehicle 102 may again select the mode that is associated with the shortest distance.

The example of FIG. 3 illustrates that there are times that the vehicle 102 is able to select the mode for operating the vehicle 102 and other times that the vehicle 102 may switch the mode for operating the vehicle 102 based on other circumstances, such as for safety reasons. However, as long as the vehicle 102 selects the mode that is associated with the shortest distance whenever the vehicle 102 is able to select the mode, the distance that the vehicle 102 travels while operating in the first mode should remain substantially equal to the distance that the vehicle 102 travels while operating in the second mode.

Figure 4:
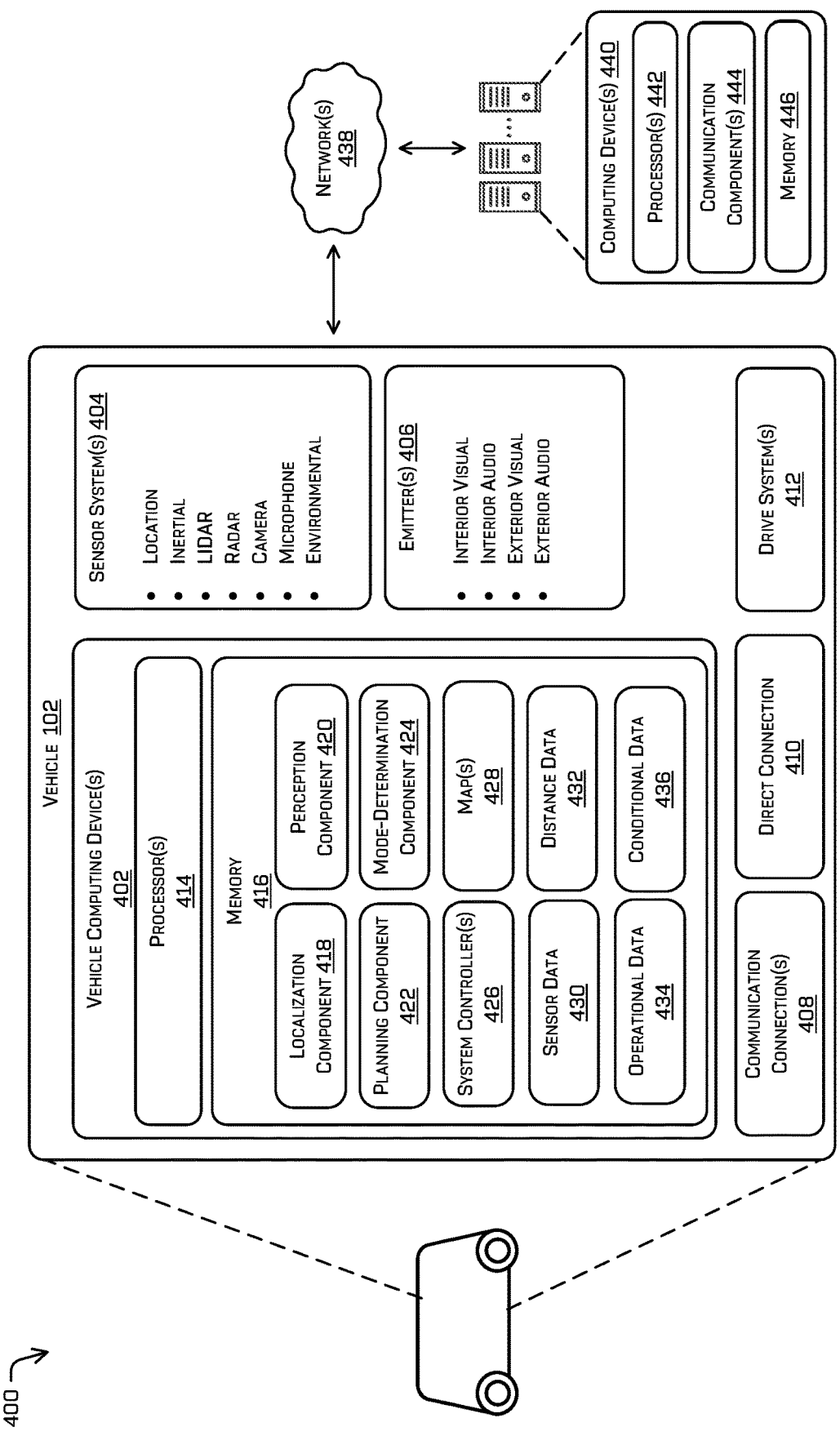
FIG. 4 depicts a block diagram of an example system for implementing the techniques described herein.

FIG. 4 depicts a block diagram of an example system 400 for implementing the techniques described herein, in accordance with embodiments of the disclosure. In at least one example, the system 400 can include the vehicle 102. The vehicle 102 can include a vehicle computing device 402, one or more sensor systems 404, one or more emitters 406, one or more communication connections 408, at least one direct connection 410, and one or more drive systems 412.

The vehicle computing device 402 can include one or more processors 414 and a memory 416 communicatively coupled with the processor(s) 414. In the illustrated example, the vehicle 102 is an autonomous vehicle. However, the vehicle 102 may be any other type of vehicle (e.g., a manually driven vehicle, a semi-autonomous vehicle, etc.), or any other system having at least an image capture device. In the illustrated example, the memory 416 of the vehicle computing device 402 stores a localization component 418, a perception component 420, a planning component 422, a mode-determination component 424, one or more system controllers 426, and one or more maps 428. Though depicted in FIG. 4 as residing in the memory 416 for illustrative purposes, it is contemplated that the localization component 418, the perception component 420, the planning component 422, the mode-determination component 424, the system controller(s) 426, and/or the map(s) 428 can additionally, or alternatively, be accessible to the vehicle 102 (e.g., stored on, or otherwise accessible by, memory remote from the vehicle 102).

In at least one example, the localization component 418 can include functionality to receive sensor data 430 from the sensor system(s) 404 and to determine a position and/or orientation of the vehicle 102 (e.g., one or more of an x-, y-, z-position, roll, pitch, or yaw). For example, the localization component 418 can include and/or request/receive a map of an environment and can continuously determine a location and/or orientation of the vehicle 102 within the map. In some instances, the localization component 418 can utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the vehicle 102. In some instances, the localization component 418 can provide data to various components of the vehicle 102 to determine an initial position of the vehicle 102 for generating a candidate trajectory, as discussed herein.

In some instances, the perception component 420 can include functionality to perform object detection, segmentation, and/or classification. In some instances, the perception component 420 can provide processed sensor data 430 that indicates a presence of an object that is proximate to the vehicle 102 and/or a classification of the object as an object type (e.g., car, pedestrian, cyclist, animal, building, tree, road surface, curb, sidewalk, unknown, etc.). In additional and/or alternative examples, the perception component 420 can provide processed sensor data 430 that indicates one or more characteristics associated with a detected object and/or the environment in which the object is positioned. In some instances, characteristics associated with an object can include, but are not limited to, an x-position (global position), a y-position (global position), a z-position (global position), an orientation (e.g., a roll, pitch, yaw), an object type (e.g., a classification), a velocity of the object, an acceleration of the object, an extent of the object (size), etc. Characteristics associated with the environment can include, but are not limited to, a presence of another object in the environment, a state of another object in the environment, a time of day, a day of a week, a season, a weather condition, an indication of darkness/light, etc.

In general, the planning component 422 can determine a path for the vehicle 102 to follow to traverse through an environment. For example, the planning component 422 can determine various routes and trajectories and various levels of detail. For example, the planning component 422 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 422 can generate an instruction for guiding the vehicle 102 along at least a portion of the route from the first location to the second location. In at least one example, the planning component 422 can determine how to guide the vehicle 102 from a first waypoint in the sequence of waypoints to a second waypoint in the sequence of waypoints. In some instances, the instruction can be a trajectory, or a portion of a trajectory. In some instances, multiple trajectories can be substantially simultaneously generated (e.g., within technical tolerances) in accordance with a receding horizon technique, wherein one of the multiple trajectories is selected for the vehicle 102 to navigate.

In at least one example, the planning component 422 can determine a pickup location associated with a location. As used herein, a pickup location can be a specific location (e.g., a parking space, a loading zone, a portion of a ground surface, etc.) within a threshold distance of a location (e.g., an address or location associated with a dispatch request) where the vehicle 102 can stop to pick up a passenger. In at least one example, the planning component 422 can determine a pickup location based at least in part on determining a user identity (e.g., determined via image recognition or received as an indication from a user device, as discussed herein). Arrival at a pickup location, arrival at a destination location, entry of the vehicle by a passenger, and receipt of a "start ride" command are additional examples of events that may be used for event-based data logging.

In general, the mode-determination component 424 may be configured to perform one or more of the processes described herein in order to select a mode for operating the vehicle 102. For example, the mode-determination component 424 may determine that an event occurred. As described herein, an event may include, but is not limited to, a period of time elapsing, an instruction being received for navigating to a location, the vehicle 102 being capable of changing the mode of operation (e.g., the vehicle 102 being capable of changing the direction of travel), and/or the like. Based on determining that the event occurred, the mode-detection component 424 may analyze distance data 432 representing at least distances traveled by the vehicle 102 when operating in different modes. For example, the distance data 432 may represent at least a first distance that the vehicle 102 has traveled while operating in the first mode and a second distance that the vehicle 102 has traveled while operating in the second mode, where the first mode and the second mode are described above. The mode-determination component 424 may then select a mode for operating the vehicle 102 based on the distances. For example, the mode-determination component 424 may select the mode that is associated with the shortest distance.

In some examples, the mode-determination component 424 may use one or more additional and/or alternative techniques for selecting the mode for operating the vehicle 102. For example, the vehicle 102 may store operational data 434 representing one or more operational factors associated with navigating the vehicle 102 in the first mode and one or more second operational factors associated with navigating the vehicle 102 in the second mode. As described herein, the one or more operational factors may include, but are not limited to, a torque loading that is applied, a number of clutch engagements, an environment for which the vehicle 102 is navigating (e.g., in a city, in a rural area, on a highway, etc.), and/or the like. Operational factors, as used herein, can include a temperature of an environment or a component, an incline that a vehicle traverses, a road roughness, an environmental humidity, a resistive force applied to a motor/actuator, an age of lubricant applied to a component, or other factors indicative of an amount of wear that a component receives during operation. The mode-determination component 424 may then additionally, and/or alternatively, use the operational data 434 when selecting the mode for operating the vehicle 102. For example, the mode-determination component 424 may select the mode (and/or drive system) that is associated with the least amount of torque loading. For another example, the mode-determination component 424 may select the mode (and/or the drive system) that is associated with the least number of clutch engagements.

Additionally, in some examples, the vehicle 102 may store conditional data 436 representing one or more current conditions associated with the vehicle 102. As described herein, the current conditions may include, but are not limited to, a number of passengers within the vehicle 102, location(s) of the passenger(s) within the vehicle 102, the environment for which the vehicle 102 is currently navigating, the current weather, the expected distance that the vehicle 102 will travel, and/or the like. The mode-determination component 424 may then additionally, and/or alternatively, use the conditional data 436 when selecting the mode for operating the vehicle 102. For example, the vehicle 102 may be configured to navigate in a direction of travel that is opposite to where the passengers are located within the vehicle 102. As such, if the passengers are located within the vehicle 102 at locations that are close to the first end of the vehicle 102, then the mode-determination component 424 may use that conditional data 436 to select the second mode for operating the vehicle 102.

In some examples, after selecting a mode for operating the vehicle 102, the mode-determination component 424 may cause the vehicle 102 to at least initially operate in the mode (e.g., cause the vehicle 102 to navigate in the direction of travel that is associated with the mode). In some examples, to cause the vehicle 102 to operate in the mode, the mode-detection component 424 may generate an instruction to operate in the mode and send the instruction to another component of the vehicle 102, such as the planning component 422. The planning component 422 may then use the instruction when determining the path for the vehicle 102. For example, the planning component 422 may determine the path such that the vehicle 102 initially begins the path while operating in the selected mode.

In at least one example, the vehicle computing device 402 can include the system controller(s) 426, which can be configured to control steering, propulsion, braking, safety, emitters, communication, and other systems of the vehicle 102. These system controller(s) 426 can communicate with and/or control corresponding systems of the drive system(s) 412 and/or other components of the vehicle 102.

The memory 416 can further include the map(s) 428 that can be used by the vehicle 102 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment and can be loaded into working memory as needed. In at least one example, the map(s) 428 can include at least one map (e.g., images and/or a mesh). In some example, the vehicle 102 can be controlled based at least in part on the map(s) 428. That is, the map(s) 428 can be used in connection with the localization component 418, the perception component 420, and/or the planning component 422 to determine a location of the vehicle 102, identify entities in an environment, and/or generate routes and/or trajectories to navigate within an environment.

In some instances, aspects of some or all of the components discussed herein can include any models, algorithms, and/or machine learning algorithms. For example, in some instances, the components in the memory 416 can be implemented as a neural network. As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based at least in part on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet40, ResNet101, VGG, DenseNet, PointNet, and the like.

As discussed above, in at least one example, the sensor system(s) 404 can include lidar sensors, radar sensors, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 404 can include multiple instances of each of these or other types of sensors. For instance, the lidar sensors can include individual lidar sensors located at the corners, front, back, sides, and/or top of the vehicle 102. As another example, the camera sensors can include multiple cameras disposed at various locations about the exterior and/or interior of the vehicle 102. The sensor system(s) 404 can provide input to the vehicle computing device 402. Additionally or alternatively, the sensor system(s) 404 can send the sensor data 430, via the one or more network(s) 438, to computing device(s) 440 at a particular frequency, after a lapse of a predetermined period of time, upon occurrence of one or more conditions, in near real-time, etc.

The vehicle 102 can also include the emitter(s) 406 for emitting light and/or sound, as described above. The emitter(s) 406 in this example include interior audio and visual emitters to communicate with passengers of the vehicle 102. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 406 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 102 can also include the communication connections(s) 408 that enable communication between the vehicle 102 and one or more other local or remote computing device(s). For instance, the communication connection(s) 408 can facilitate communication with other local computing device(s) on the vehicle 102 and/or the drive system(s) 412. Also, the communication connection(s) 408 can allow the vehicle 102 to communicate with other nearby computing device(s) (e.g., other nearby vehicles, traffic signals, etc.). The communications connection(s) 408 also enable the vehicle 102 to communicate with the remote teleoperations computing devices or other remote services.

The communications connection(s) 408 can include physical and/or logical interfaces for connecting the vehicle computing device 402 to another computing device or a network, such as network(s) 438. For example, the communications connection(s) 408 can enable Wi-Fi-based communication such as via frequencies defined by the IEEE 802.11 standards, short range wireless frequencies such as Bluetooth®, cellular communication (e.g., 2G, 2G, 4G, 4G LTE, 4G, etc.) or any suitable wired or wireless communications protocol that enables the respective computing device to interface with the other computing device(s).

In at least one example, the vehicle 102 can include one or more drive systems 412. In some instances, the vehicle 102 can have a single drive system 412. In at least one example, if the vehicle 102 has multiple drive systems 412, individual drive systems 412 can be positioned on opposite ends of the vehicle 102 (e.g., the front and the rear, etc.). In at least one example, the drive system(s) 412 can include one or more sensor systems to detect conditions of the drive system(s) 412 and/or the surroundings of the vehicle 102. By way of example and not limitation, the sensor system(s) 404 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system(s), cameras or other image sensors, ultrasonic sensors to acoustically detect entities in the surroundings of the drive system(s), lidar sensors, radar sensors, etc. Some sensors, such as the wheel encoders can be unique to the drive system(s) 412. In some cases, the sensor system(s) 404 on the drive system(s) 412 can overlap or supplement corresponding systems of the vehicle 102 (e.g., sensor system(s) 404).

The drive system(s) 412 can include many of the vehicle systems, including a high voltage battery, a motor to propel the vehicle 102, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 412 can include a drive system controller which can receive and preprocess the sensor data 430 from the sensor system(s) 404 and to control operation of the various vehicle systems. In some instances, the drive system controller can include one or more processors and memory communicatively coupled with the one or more processors. The memory can store instructions to perform various functionalities of the drive system(s) 412. Furthermore, the drive system(s) 412 also include one or more communication connection(s) that enable communication by the respective drive system with one or more other local or remote computing device(s).

In at least one example, the direct connection 410 can provide a physical interface to couple the one or more drive system(s) 412 with the body of the vehicle 102. For example, the direct connection 410 can allow the transfer of energy, fluids, air, data, etc. between the drive system(s) 412 and the vehicle 102. In some instances, the direct connection 410 can further releasably secure the drive system(s) 412 to the body of the vehicle 102.

As further illustrated in FIG. 4, the computing device(s) 440 can include processor(s) 442, communication connection(s) 444, and memory 446. The processor(s) 414 of the vehicle 102 and/or the processor(s) 442 of the computing device(s) 440 (and/or other processor(s) described herein) can be any suitable processor capable of executing instructions to process data and perform operations as described herein. By way of example and not limitation, the processor(s) 414 and the processor(s) 442 can comprise one or more Central Processing Units (CPUs), Graphics Processing Units (GPUs), or any other device or portion of a device that processes electronic data to transform that electronic data into other electronic data that can be stored in registers and/or memory. In some instances, integrated circuits (e.g., ASICs, etc.), gate arrays (e.g., FPGAs, etc.), and other hardware devices can also be considered processors in so far as they are configured to implement encoded instructions.

The memory 416 and the memory 446 (and/or other memory described herein) are examples of non-transitory computer-readable media. The memory 416 and the memory 446 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 4 is illustrated as a distributed system, in alternative examples, components of the computing device(s) 440 can be associated with the vehicle 102. That is, the vehicle 102 can perform one or more of the functions associated with the computing device(s) 440 and/or the computing device(s) 440 can perform one or more of the functions associated with the vehicle 102. For example, the computing device(s) 440 may include the mode-determination component 424, the distance data 432, the operational data 434, and/or the conditional data 436. The computing device(s) 440 may then use the mode-determination component 424 to perform one or more of the processes described herein. Additionally, the computing device(s) 440 may then send, over the network(s) 438, instructions to the vehicle 102, where the instructions cause the vehicle 102 to operate in the selected modes.

Figure 5:
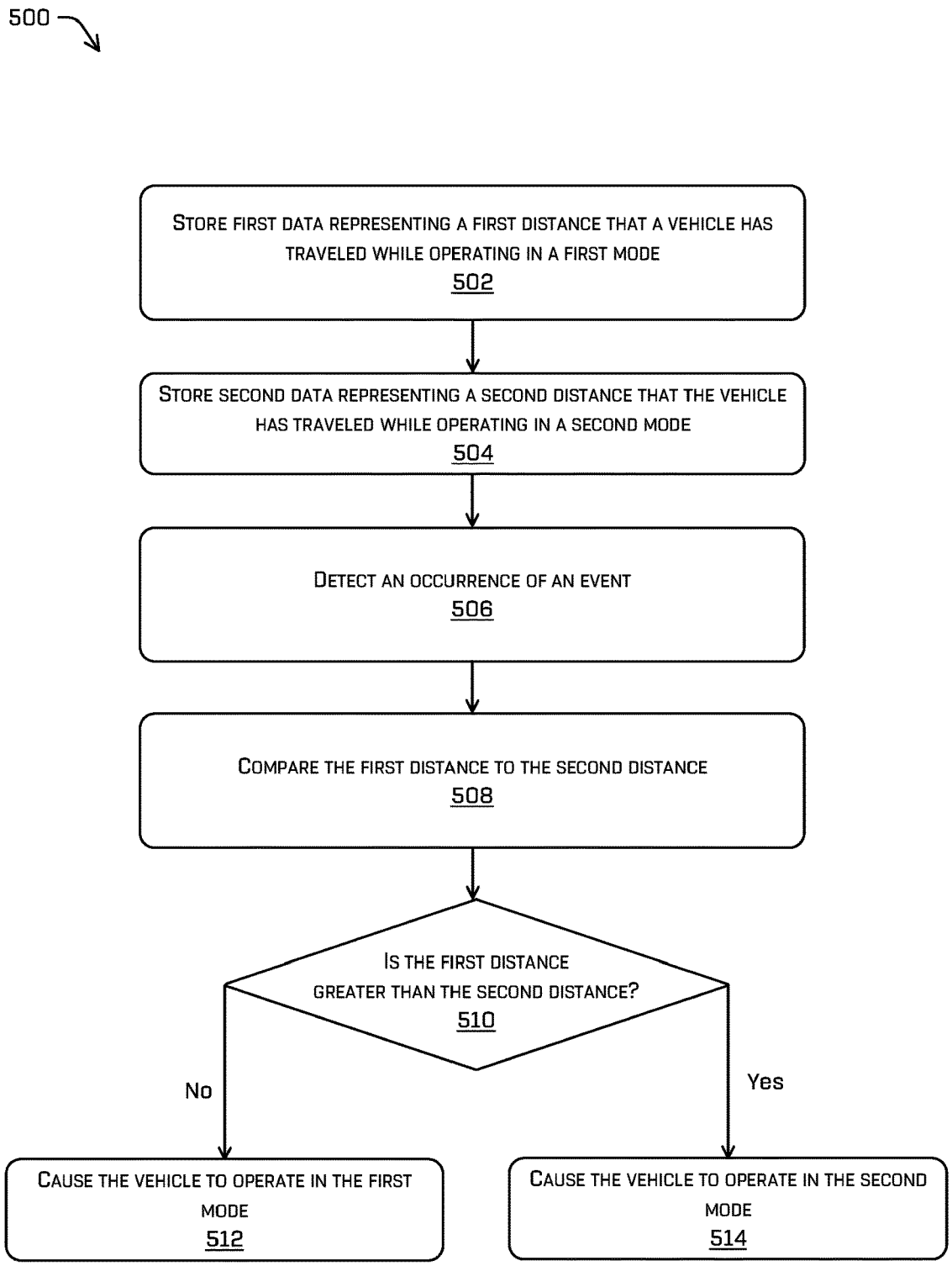
FIG. 5 illustrates a flow diagram of an example process for selecting a mode for a vehicle based on distances the vehicle traveled while operating in different modes.
Figure 6:
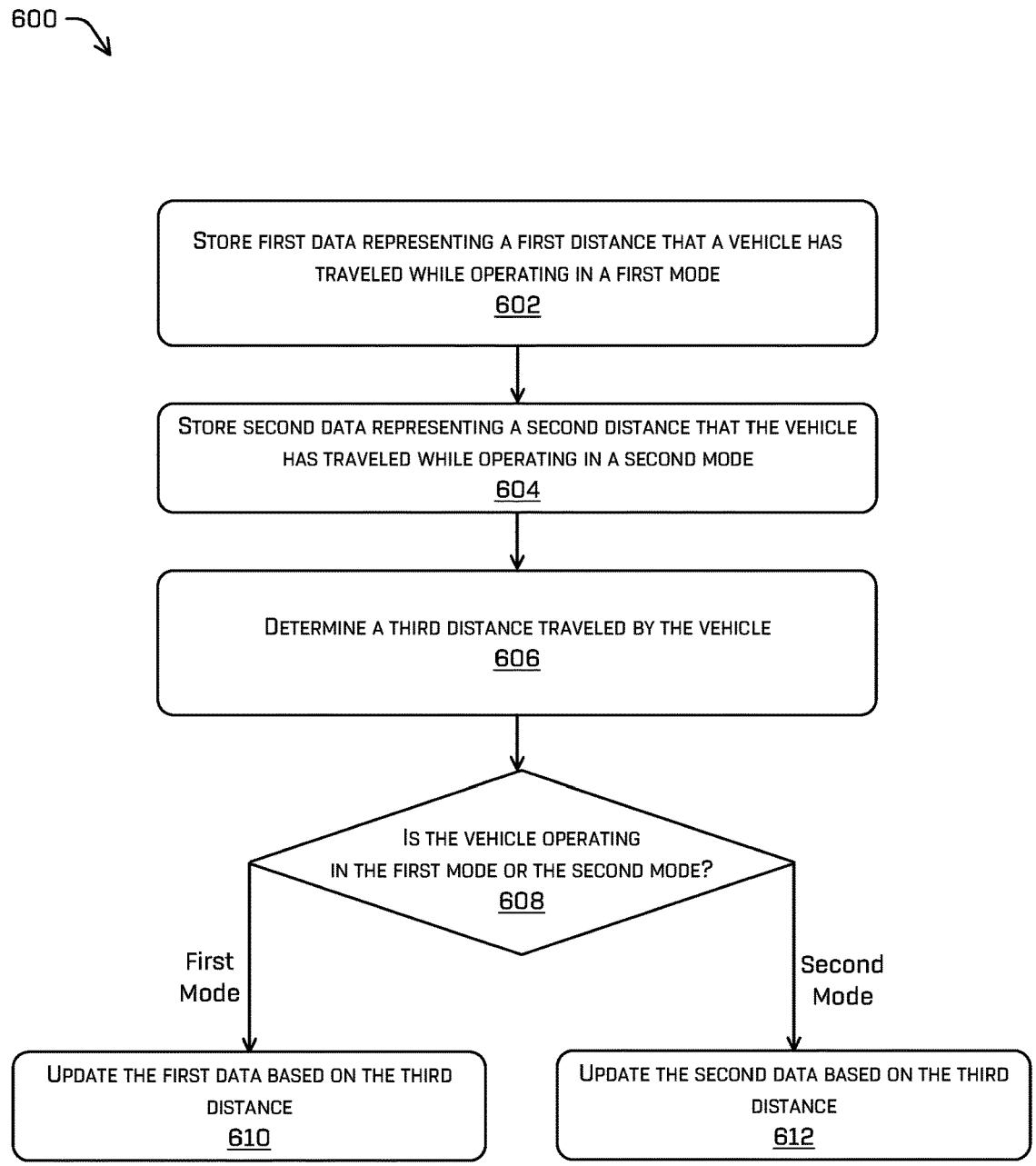
FIG. 6 illustrates a flow diagram of an example process for storing data representing distances traveled by a vehicle while operating in different modes.
Figure 7:
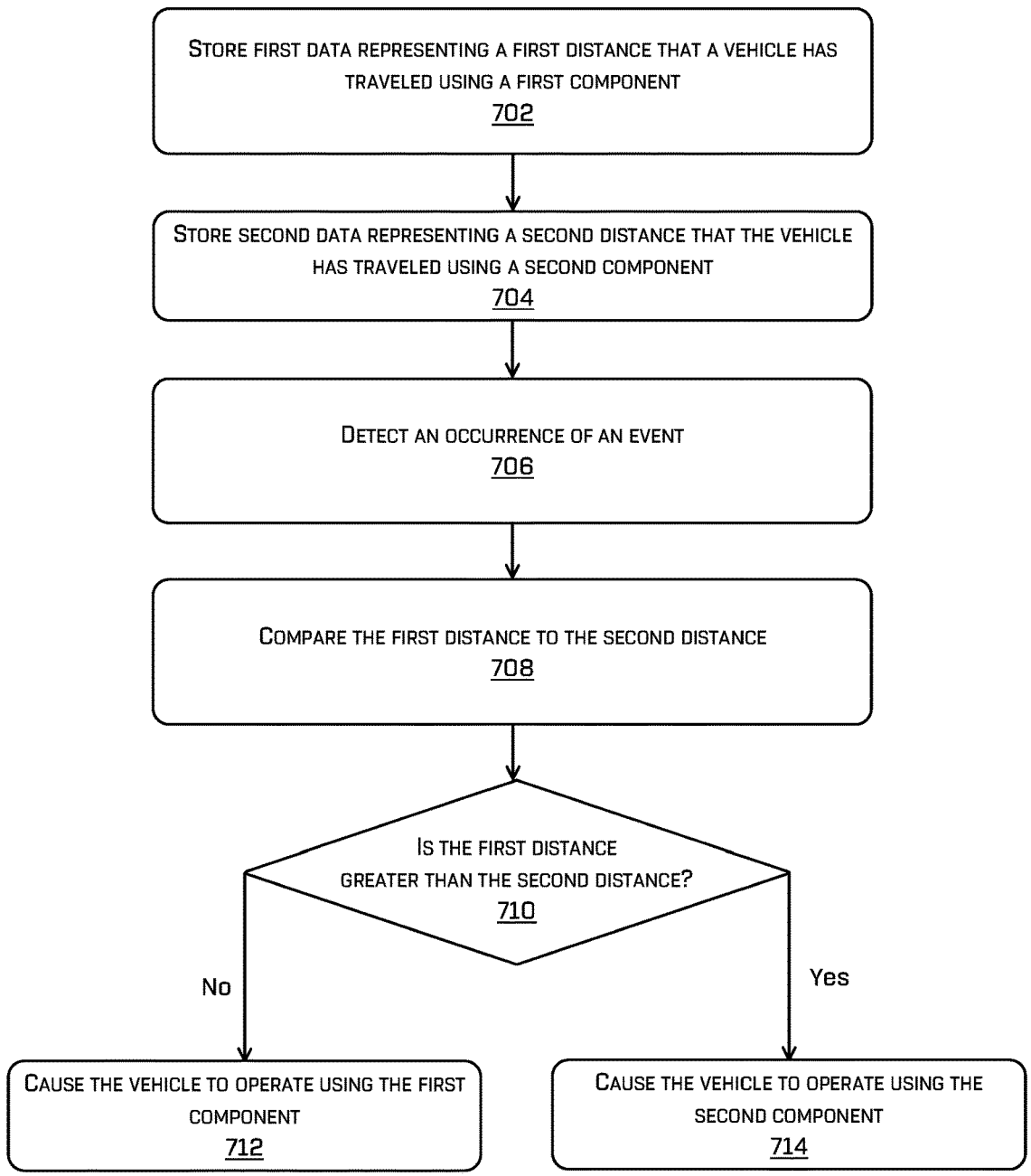
FIG. 7 illustrates a flow diagram of an example process for selecting a component for a vehicle based on distances the vehicle has traveled using different components.

FIGS. 5-7 illustrate example processes in accordance with the disclosure. These processes are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be omitted or combined in any order and/or in parallel to implement the processes.

FIG. 5 illustrates a flow diagram of an example process 500 for selecting a mode for the vehicle 102 based on distances the vehicle 102 traveled while operating in different modes. At operation 502, the process 500 may include storing first data representing a first distance a vehicle has traveled while operating in a first mode. For instance, the vehicle 102 may store the first data representing the first distance. As described herein, when operating in the first mode, a first end of the vehicle 102 may operate as a front of the vehicle 102. For example, one or more lights located on the first end of the vehicle 102 may operate as the headlights while one or more lights located on a second, opposite end of the vehicle 102 may operate as the taillights. As such, the vehicle 102 may travel in a first direction of travel while operating in the first mode. Additionally, the vehicle 102 may update the first data as the vehicle 102 continues to travel while operating in the first mode.

At operation 504, the process 500 may include storing second data representing a second distance that the vehicle has traveled while operating in a second mode. For instance, the vehicle 102 may store the second data representing the second distance. As described herein, when operating in the second mode, the second end of the vehicle 102 may operate as the front of the vehicle 102. For example, the one or more lights located on the second end of the vehicle 102 may operate as the headlights while the one or more lights located on the first end of the vehicle 102 operate as the taillights. As such, the vehicle 102 may travel in a second direction of travel while operating in the second mode. Additionally, the vehicle 102 may update the second data as the vehicle 102 continues to travel while operating in the second mode.

At operation 506, the process 500 may include detecting an occurrence of an event. For instance, the vehicle 102 may detect the occurrence of the event. As described herein, the vehicle 102 may detect the occurrence of the event by determining that a period of time has elapsed, receiving an instruction to navigate to a location, determining that the vehicle 102 is at a location for which the vehicle 102 is able to switch the mode for operating the vehicle 102, and/or the like.

At operation 508, the process 500 may include comparing the first distance to the second distance and at operation 510, the process 500 may include determining whether the first distance is greater than the second distance. For instance, based on detecting the occurrence of the event, the vehicle 102 may compare the first distance represented by the first data to the second distance represented by the second data. Based on the comparison, the vehicle 102 may determine whether the first distance is greater than the second distance.

If, at operation 510, it is determined that the first distance is not greater than the second distance, then at operation 512, the process 500 may include causing the vehicle to operate in the first mode. For instance, if the vehicle 102 determines that the first distance is not greater than the second distance, then the vehicle 102 may operate in the first mode. However, at operation 510, if it is determined that the first distance is greater than the second distance, then at operation 514, the process 500 may include causing the vehicle to operate in the second mode. For instance, if the vehicle 102 determines that the first distance is greater than the second distance, then the vehicle 102 may operate in the second mode. In other words, the vehicle 102 may operate in the mode that is associated with the shortest distance.

In some examples, as the vehicle 102 continues to navigate, the vehicle 102 may repeat the example process 500 of FIG. 5. For instance, the vehicle 102 may continue to update the first data as the vehicle 102 continues to navigate in the first mode and/or continue to update the second data as the vehicle 102 continues to navigate in the second mode (see the example of FIG. 6). The vehicle 102 may then detect an occurrence of an additional event and, based on the detection, compare the distance represented by the first data to the distance represented by the second data. Additionally, the vehicle 102 may select the mode that is associated with the shortest distance.

FIG. 6 illustrates a flow diagram of an example process 600 for storing data representing distances traveled by the vehicle 102 while operating in different modes. At operation 602, the process 600 may include storing first data representing a first distance a vehicle has traveled while operating in a first mode. For instance, the vehicle 102 may store the first data representing the first distance. As described herein, when operating in the first mode, a first end of the vehicle 102 may operate as a front of the vehicle 102. For example, one or more lights located on the first end of the vehicle 102 may operate as the headlights while one or more lights located on a second, opposite end of the vehicle 102 may operate as the taillights. As such, the vehicle 102 may travel in a first direction of travel while operating in the first mode. Additionally, the vehicle 102 may update the first data as the vehicle 102 continues to travel while operating in the first mode.

At operation 604, the process 600 may include storing second data representing a second distance that the vehicle has traveled while operating in a second mode. For instance, the vehicle 102 may store the second data representing the second distance. As described herein, when operating in the second mode, the second end of the vehicle 102 may operate as the front of the vehicle 102. For example, the one or more lights located on the second end of the vehicle 102 may operate as the headlights while the one or more lights located on the first end of the vehicle 102 operate as the taillights. As such, the vehicle 102 may travel in a second direction of travel while operating in the second mode. Additionally, the vehicle 102 may update the second data as the vehicle 102 continues to travel while operating in the second mode.

At operation 606, the process 600 may include determining a third distance traveled by the vehicle and at operation 608, the process 600 may include determining whether the vehicle is operating in the first mode or the second mode. For instance, while navigating, the vehicle 102 may continue to determine the third distance that is traveled by the vehicle 102. The vehicle 102 may also determine whether the vehicle 102 is operating in the first mode or the second mode. In some examples, the vehicle 102 may make the determination based on the direction of travel of the vehicle 102. For example, the vehicle 102 may determine that the vehicle 102 is operating in the first mode when a first end of the vehicle 102 operates as the front of the vehicle 102 such that the vehicle 102 is navigating in a first direction of travel. Additionally, the vehicle 102 may determine that the vehicle 102 is operating in the second mode when a second end of the vehicle 102 is operating as the front of the vehicle 102 such that the vehicle 102 is navigating in a second direction of travel.

If, at operation 608, it is determined that the vehicle is operating in the first mode, then at operation 610, the process 600 may include updating the first data based on the third distance. For instance, if the vehicle 102 determines that the vehicle 102 is operating in the first mode, then the vehicle 102 may update the first data based on the third distance. For example, the vehicle 102 may update the first data to represent a fourth distance that is based on the first distance and the third distance. For instance, the fourth distance may include the first distance plus the third distance. Additionally, the vehicle 102 may repeat the process 600 to continue to update the distances.

However, if, at operation 608, it is determined that the vehicle is operating in the second mode, then at operation 612, the process 600 may include updating the second data based on the third distance. For instance, if the vehicle 102 determines that the vehicle 102 is operating in the second mode, then the vehicle 102 may update the second data based on the third distance. For example, the vehicle 102 may update the second data to represent a fifth distance that is based on the second distance and the third distance. For instance, the fifth distance may include the second distance plus the third distance. Additionally, the vehicle 102 may repeat the process 600 to continue to update the distance.

While the example of FIG. 6 describes that the distances are associated with different modes and then updating the data based on the determined mode, in other examples, the distances may be associated with different components of the vehicle 102 and the updating of the data may be based on the component that the vehicle 102 uses while navigating the third distance. In other words, the distances may be associated with the modes of the vehicle 102, components of the vehicle 102, operational factors of the vehicle 102, and/or the like.

FIG. 7 illustrates a flow diagram of an example process 700 for selecting a component for the vehicle 102 based on distances the vehicle 102 has traveled using different components. At operation 702, the process 700 may include storing first data representing a first distance a vehicle has traveled using a first component and at operation 704, the process 700 may include storing second data representing a second distance the vehicle has traveled using a second component. For instance, the vehicle 102 may store the first data representing the first distance and the second data representing the second distance. As described herein, a component may include, but is not limited to, a drive system; a wheel; a pump; a brake unit; a radiator; a steering unit; a bearing, and/or any other component of the vehicle 102.

At operation 706, the process 700 may include detecting an occurrence of an event. For instance, the vehicle 102 may detect the occurrence of the event. As described herein, the vehicle 102 may detect the occurrence of the event by determining that a period of time has elapsed, receiving an instruction to navigate to a location, determining that the vehicle 102 is at a location for which the vehicle 102 is able to switch the mode for operating the vehicle 102, and/or the like.

At operation 708, the process 700 may include comparing the first distance to the second distance and at operation 710, the process 700 may include determining whether the first distance is greater than the second distance. For instance, based on detecting the occurrence of the event, the vehicle 102 may compare the first distance represented by the first data to the second distance represented by the second data. Based on the comparison, the vehicle 102 may determine whether the first distance is greater than the second distance.

If, at operation 710, it is determined that the first distance is not greater than the second distance, then at operation 712, the process 700 may include causing the vehicle to operate using the first component. For instance, if the vehicle 102 determines that the first distance is not greater than the second distance, then the vehicle 102 may operate using the first component, such as a first drive system. However, if at operation 710, it is determined that the first distance is greater than the second distance, then at operation 714, the process 700 may include causing the vehicle to operate using the second component. For instance, if the vehicle 102 determines that the first distance is greater than the second distance, then the vehicle 102 may operate using the second component, such as a second drive system.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

EXAMPLE CLAUSES

A: A system comprising: one or more processors; and one or more computer-readable media storing instructions that, when executed by the one or more processors, cause the one or more processors to perform operations comprising: storing first data representing a first distance that a vehicle has traveled while operating in a first mode, a first end of the vehicle operating as a front of the vehicle when in the first mode; storing second data representing a second distance that the vehicle has traveled while operating in a second mode, a second end of the vehicle operating as the front of the vehicle when in the second mode, the second end being different from the first end; determining that the first distance is greater than the second distance; based at least in part on the first distance being greater than the second distance, determining to operate the vehicle in the second mode; and causing the vehicle to navigate such that the second end includes the front of the vehicle.

B: The system as recited in paragraph A, the operations further comprising: storing third data representing one or more first operational factors associated with the vehicle operating in the first mode; and storing fourth data representing one or more second operational factors associated with the vehicle operating in the second mode, wherein determining to operate in the vehicle in the second mode is further based at least in part on the one or more first operational factors and the one or more second operational factors.

C: The system as recited in either paragraph A or paragraph B, the operations further comprising: storing third data representing a third distance that the vehicle has traveled using a first drive system; storing fourth data representing a fourth distance that the vehicle has traveled using a second drive system; determining that the third distance is greater than the fourth distance; and based at least in part on the third distance being greater than the fourth distance, determining to operate the vehicle using the second drive system.

D: The system as recited in any one of paragraphs A-C, the operations further comprising: updating the first data to represent a third distance that the vehicle has traveled while operating in the first mode; updating the second data to represent a fourth distance that the vehicle has traveled while operating in the second mode; determining that the fourth distance is greater than the third distance; based at least in part on the fourth distance being greater than the third distance, determining to operate the vehicle in the first mode; and causing the vehicle to navigate such that the first end includes the front of the vehicle.

E: A method comprising: storing first data representing a first measure associated with wear of a component caused by a vehicle traveling while navigating in a first drive mode; storing second data representing a second measure associated with wear of the component caused by the vehicle traveling while navigating in a second drive mode; determining, based at least in part on the first measure and the second measure, to cause the vehicle to navigate in the first drive mode; and causing the vehicle to navigate in the first drive mode.

F: The method as recited in paragraph E, wherein: the first measure represents a first distance that the vehicle has traveled while operating in the first drive mode, a first end of the vehicle including a front of the vehicle when operating in the first drive mode; and the second measure represents a second distance that the vehicle has traveled while operating in a second drive mode, a second end of the vehicle including the front of the vehicle when operating in the second drive mode.

G: The method as recited in either paragraph E or paragraph F, further comprising: determining that the second measure is greater than the first measure, wherein determining to cause the vehicle to navigate in the first drive mode is based at least in part on the second measure being greater than the first measure.

H: The method as recited in any one of paragraphs E-G, further comprising: detecting an occurrence of an event, wherein determining to cause the vehicle to navigate in the first drive mode is further based at least in part on the occurrence of the event.

I: The method as recited in paragraph H, wherein detecting the occurrence of the event comprises at least one of: determining that a current time includes a scheduled time; receiving an instruction to navigate to a first location; or determining that the vehicle is stopped at a second location where the vehicle is able to navigate in a first direction of travel and a second distance of travel J: The method as recited in any one of paragraphs E-I, wherein the component comprises at least one of: a drive system; a wheel; a pump; a brake unit; a radiator; a fan; a steering unit; or a bearing.

K: The method as recited in any one of paragraphs E-J, further comprising: storing third data representing one or more first operational factors associated with the vehicle operating in the first drive mode; and storing fourth data representing one or more second operational factors associated with the vehicle operating in the second drive mode, wherein determining to cause the vehicle to operate in the first drive mode is further based at least in part on the one or more first operational factors and the one or more second operational factors.

L: The method as recited in paragraph K, wherein: the one or more first operations factors include at least one of: a first torque loading; a first number of clutch engagements; first weather conditions; or first types of driving environments; and the one or more second operations factors include at least one of: a second torque loading; a second number of clutch engagements; second weather conditions; or second types of driving environments M: The method as recited in any one of paragraphs E-L, further comprising: storing third data representing a third distance that the vehicle has traveled using a first drive system; storing fourth data representing a fourth distance that the vehicle has traveled using a second drive system; and selecting the first drive system based at least in part on the third distance and the fourth distance.

N: The method as recited in any one of paragraphs E-M, further comprising: determining a third measure that the vehicle has navigated in the first drive mode; updating the first data to represent a fourth measure that is based at least in part on the first measure and the third measure; determining that the vehicle has navigated a fifth measure in the second drive mode; updating the second data to represent a sixth measure that is based at least in part on the second measure and the fifth measure; determining, based at least in part on the fourth measure and the sixth measure, to cause the vehicle to navigate in the second drive mode; and causing the vehicle to navigate in the second drive mode.

O: The method as recited in any one of paragraphs E-N, wherein the vehicle includes a first drive system associated with a first wheel of the vehicle and a second drive system associated with a second wheel of the vehicle, and wherein the method further comprises: determining, based at least in part on the first measure and the second measure, to cause the vehicle to navigate using the first drive system; and causing the vehicle to navigate using the first drive system.

P: The method as recited in any one of paragraphs E-O, wherein: the first measure represents a first time that the vehicle has traveled while operating in the first drive mode, a first end of the vehicle including a front of the vehicle when operating in the first drive mode; and the second measure represents a second time that the vehicle has traveled while operating in the second drive mode, a second end of the vehicle including the front of the vehicle when operating in the second drive mode.

Q: The method as recited in any one of paragraphs E-P, wherein: the first drive mode is associated with at least one of: a first direction of travel; a first drive system; or a first steering system; and the second drive mode is associated with at least one of: a second direction of travel; a second drive system; or a second steering system.

R: One or more non-transitory computer-readable media storing instructions that, when executed by one or more processors, cause the one or more processors to perform operations comprising: storing first data representing a first measure associated with wear of a component caused by a vehicle traveling while navigating in a first drive mode; storing second data representing a second measure associated with wear of the component caused by the vehicle traveling while navigating in a second drive mode; determining, based at least in part on the first measure and the second measure, to cause the vehicle to navigate in the first drive mode; and causing the vehicle to navigate in the first drive mode.

S: The one or more non-transitory computer-readable media as recited in paragraph R, wherein: the first measure represents a first distance that the vehicle has traveled while operating in the first drive mode, a first end of the vehicle including a front of the vehicle when operating in the first drive mode; and the second measure represents a second distance that the vehicle is traveled while operating in the second drive mode, a second end of the vehicle including the front of the vehicle when operating in the second drive mode.

T: The one or more non-transitory computer-readable media as recited either paragraph R or paragraph S, the operations further comprising: determining that the second measure is greater than the first measure, wherein determining to cause the vehicle to navigate in the first drive mode is based at least in part on the second measure being greater than the first measure.

What is claimed is:

1. A system comprising:
   one or more processors; and
   one or more computer-readable media storing instructions that, when executed by the one or more processors, cause the one or more processors to perform operations comprising:
      storing first data representing a first distance that a vehicle has traveled while operating in a first mode, a first end of the vehicle operating as a front of the vehicle when in the first mode;
      storing second data representing a second distance that the vehicle has traveled while operating in a second mode, a second end of the vehicle operating as the front of the vehicle when in the second mode, the second end being different from the first end;
      determining that the first distance is greater than the second distance;
      based at least in part on the first distance being greater than the second distance, determining to operate the vehicle in the second mode; and
      causing the vehicle to navigate such that the second end includes the front of the vehicle.

2. The system as recited in claim 1, the operations further comprising:
   storing third data representing one or more first operational factors associated with the vehicle operating in the first mode; and
   storing fourth data representing one or more second operational factors associated with the vehicle operating in the second mode,
   wherein determining to operate in the vehicle in the second mode is further based at least in part on the one or more first operational factors and the one or more second operational factors.

3. The system as recited in claim 1, the operations further comprising:

storing third data representing a third distance that the vehicle has traveled using a first drive system;
storing fourth data representing a fourth distance that the vehicle has traveled using a second drive system;
determining that the third distance is greater than the fourth distance; and
based at least in part on the third distance being greater than the fourth distance, determining to operate the vehicle using the second drive system.

4. The system as recited in claim 1, the operations further comprising:
updating the first data to represent a third distance that the vehicle has traveled while operating in the first mode;
updating the second data to represent a fourth distance that the vehicle has traveled while operating in the second mode;
determining that the fourth distance is greater than the third distance;
based at least in part on the fourth distance being greater than the third distance, determining to operate the vehicle in the first mode; and
causing the vehicle to navigate such that the first end includes the front of the vehicle.

5. A method comprising:
storing first data representing a first measure associated with wear of a component caused by a vehicle traveling while navigating in a first drive mode, wherein the first measure represents a first distance that the vehicle has traveled while operating in the first drive mode, a first end of the vehicle includes a front of the vehicle when operating in the first drive mode;
storing second data representing a second measure associated with wear of the component caused by the vehicle traveling while navigating in a second drive mode, wherein the second measure represents a second distance that the vehicle has traveled while operating in the second drive mode, a second end of the vehicle includes the front of the vehicle when operating in the second drive mode;
determining, based at least in part on the first measure and the second measure, to cause the vehicle to navigate in the first drive mode; and
causing the vehicle to navigate in the first drive mode.

6. The method as recited in claim 5, further comprising:
determining that the second measure is greater than the first measure,
wherein determining to cause the vehicle to navigate in the first drive mode is based at least in part on the second measure being greater than the first measure.

7. The method as recited in claim 5, further comprising:
detecting an occurrence of an event,
wherein determining to cause the vehicle to navigate in the first drive mode is further based at least in part on the occurrence of the event.

8. The method as recited in claim 7, wherein detecting the occurrence of the event comprises at least one of:
determining that a current time includes a scheduled time;
receiving an instruction to navigate to a first location; or
determining that the vehicle is stopped at a second location where the vehicle is able to navigate in a first direction of travel and a second direction of travel.

9. The method as recited in claim 5, wherein the component comprises at least one of:
a drive system;
a wheel;
a pump;
a brake unit;
a radiator;
a fan;
a steering unit; or
a bearing.

10. The method as recited in claim 5, further comprising:
storing third data representing one or more first operational factors associated with the vehicle operating in the first drive mode; and
storing fourth data representing one or more second operational factors associated with the vehicle operating in the second drive mode,
wherein determining to cause the vehicle to operate in the first drive mode is further based at least in part on the one or more first operational factors and the one or more second operational factors.

11. The method as recited in claim 10, wherein:
the one or more first operational factors include at least one of:
a first torque loading;
a first number of clutch engagements;
first weather conditions; or
first types of driving environments; and
the one or more second operational factors include at least one of:
a second torque loading;
a second number of clutch engagements;
second weather conditions; or
second types of driving environments.

12. The method as recited in claim 5, further comprising:
storing third data representing a third distance that the vehicle has traveled using a first drive system;
storing fourth data representing a fourth distance that the vehicle has traveled using a second drive system; and
selecting the first drive system based at least in part on the third distance and the fourth distance.

13. The method as recited in claim 5, further comprising:
determining a third measure that the vehicle has navigated in the first drive mode;
updating the first data to represent a fourth measure that is based at least in part on the first measure and the third measure;
determining that the vehicle has navigated a fifth measure in the second drive mode;
updating the second data to represent a sixth measure that is based at least in part on the second measure and the fifth measure;
determining, based at least in part on the fourth measure and the sixth measure, to cause the vehicle to navigate in the second drive mode; and
causing the vehicle to navigate in the second drive mode.

14. The method as recited in claim 5, wherein the vehicle includes a first drive system associated with a first wheel of the vehicle and a second drive system associated with a second wheel of the vehicle, and wherein the method further comprises:
determining, based at least in part on the first measure and the second measure, to cause the vehicle to navigate using the first drive system; and
causing the vehicle to navigate using the first drive system.

15. The method as recited in claim 5, wherein:
the first measure further represents a first time that the vehicle has traveled while operating in the first drive mode; and
the second measure further represents a second time that the vehicle has traveled while operating in the second drive mode.

16. The method as recited in claim 5, wherein:
the first drive mode is associated with at least one of:
- a first direction of travel;
- a first drive system; or
- a first steering system; and the second drive mode is associated with at least one of:
- a second direction of travel;
- a second drive system; or
- a second steering system.

17. One or more non-transitory computer-readable media storing instructions that, when executed by one or more processors, cause the one or more processors to perform operations comprising:

storing first data representing a first measure associated with wear of a component caused by a vehicle traveling while navigating in a first drive mode, wherein the first measure represents a first distance that the vehicle has traveled while operating in the first drive mode, a first end of the vehicle including a front of the vehicle when operating in the first drive mode;

storing second data representing a second measure associated with wear of the component caused by the vehicle traveling while navigating in a second drive mode, wherein the second measure represents a second distance that the vehicle is traveled while operating in the second drive mode, a second end of the vehicle including the front of the vehicle when operating in the second drive mode;

determining, based at least in part on the first measure and the second measure, to cause the vehicle to navigate in the first drive mode; and causing the vehicle to navigate in the first drive mode.

18. The one or more non-transitory computer-readable media as recited in claim 17, the operations further comprising:

determining that the second measure is greater than the first measure, wherein determining to cause the vehicle to navigate in the first drive mode is based at least in part on the second measure being greater than the first measure.

\* \* \* \* \*